United States Patent [19]
King et al.

[11] Patent Number: 5,417,153
[45] Date of Patent: May 23, 1995

[54] FLUIDIZING SPRAY CHILLING SYSTEM FOR PRODUCING ENCAPSULATED MATERIALS

[75] Inventors: Chwan-Kong King, Edison; Chee-Teck Tan, Middletown; Lewis G. Scharpf, Jr., Fair Haven; David P. O'Chat, Morgan; Marvin Schulman, Howell, all of N.J.

[73] Assignee: International Flavors & Fragrances Inc., New York, N.Y.

[21] Appl. No.: 103,595

[22] Filed: Aug. 9, 1993

[51] Int. Cl.$^6$ .............................................. A23L 1/22
[52] U.S. Cl. .......................................... 99/517; 99/485
[58] Field of Search ............................ 99/451, 452–455, 99/467, 470, 471, 473–475, 485, 487, 516, 517, 534; 426/89, 99, 307, 650, 302, 285; 62/63, 373

[56] References Cited

U.S. PATENT DOCUMENTS

| | | | |
|---|---|---|---|
| 3,186,909 | 6/1965 | McMurtry et al. | 426/554 |
| 3,949,094 | 4/1976 | Johnson et al. | 426/99 |
| 3,949,096 | 4/1976 | Johnson et al. | 426/302 |
| 4,201,262 | 5/1980 | Goldstein | 239/558 |
| 4,322,384 | 3/1982 | Sutton | 239/548 |
| 4,401,019 | 8/1983 | Leonov et al. | 99/516 |
| 4,445,429 | 5/1984 | Czyzewski et al. | 99/455 |
| 4,534,283 | 8/1985 | Nakamuta | 99/516 |
| 5,064,669 | 11/1991 | Tan et al. | 426/307 |
| 5,110,366 | 5/1992 | McGregor | 239/548 |
| 5,184,471 | 2/1993 | Losacco et al. | 62/63 |
| 5,315,921 | 5/1994 | Davis | 99/516 |

Primary Examiner—Timothy F. Simone
Attorney, Agent, or Firm—Arthur L. Liberman

[57] ABSTRACT

A toroidal sparger is disclosed for use in a fluidized spray chilling system for the production of encapsulated flavoring and coloring agents.

1 Claim, 14 Drawing Sheets

FIG.9
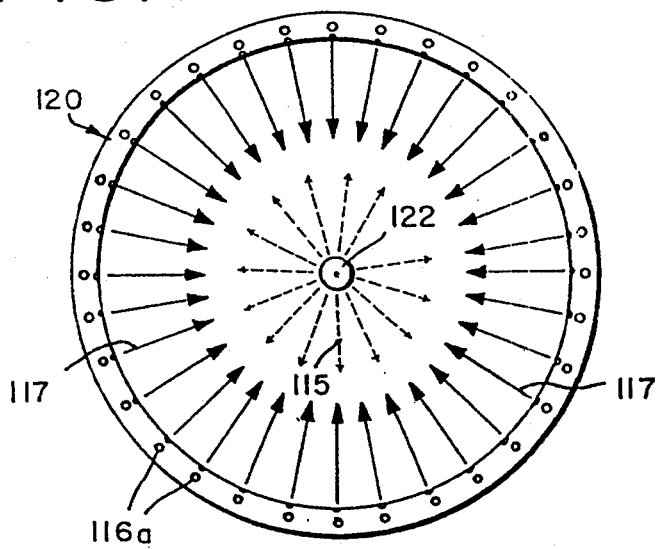
FIG.10-B
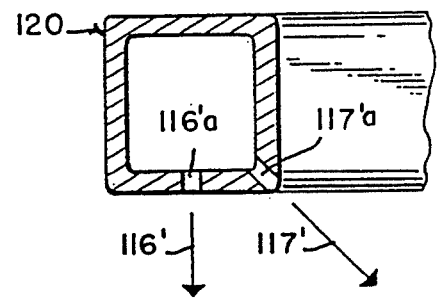
FIG.10-C
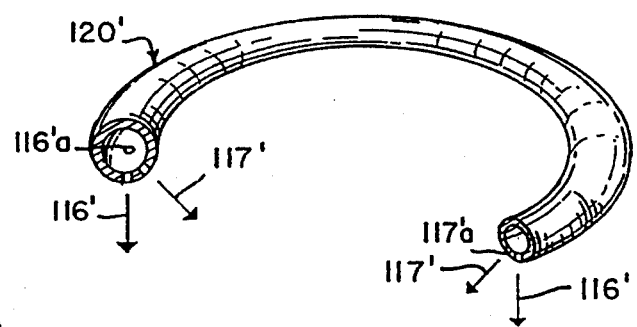
FIG.10-D
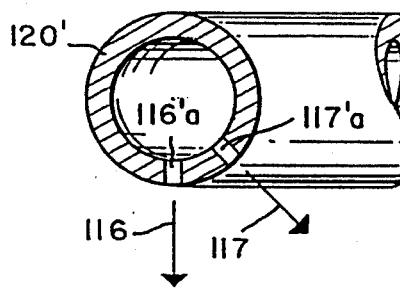
FIG.10-A
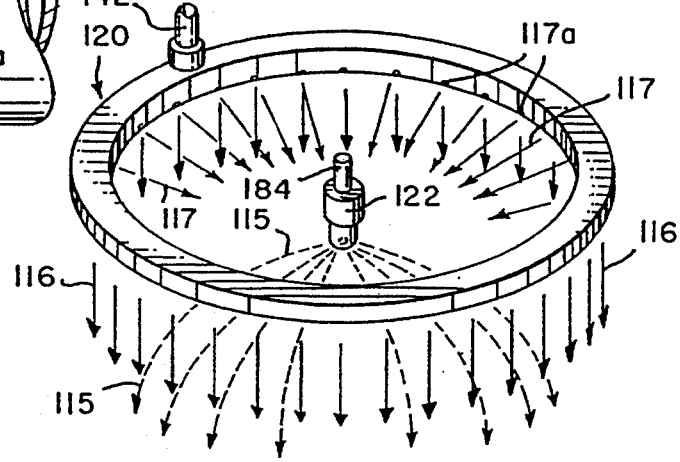

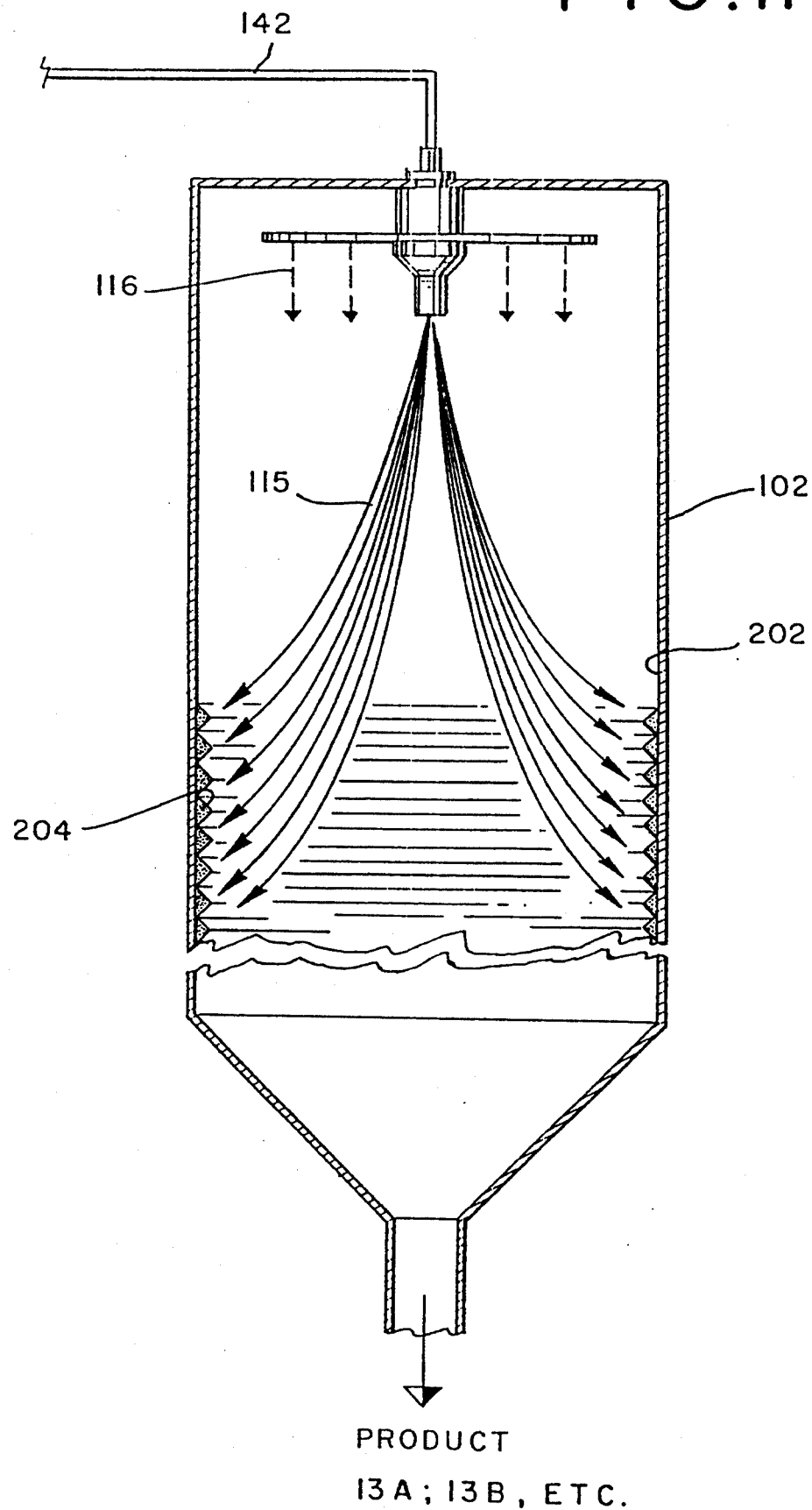

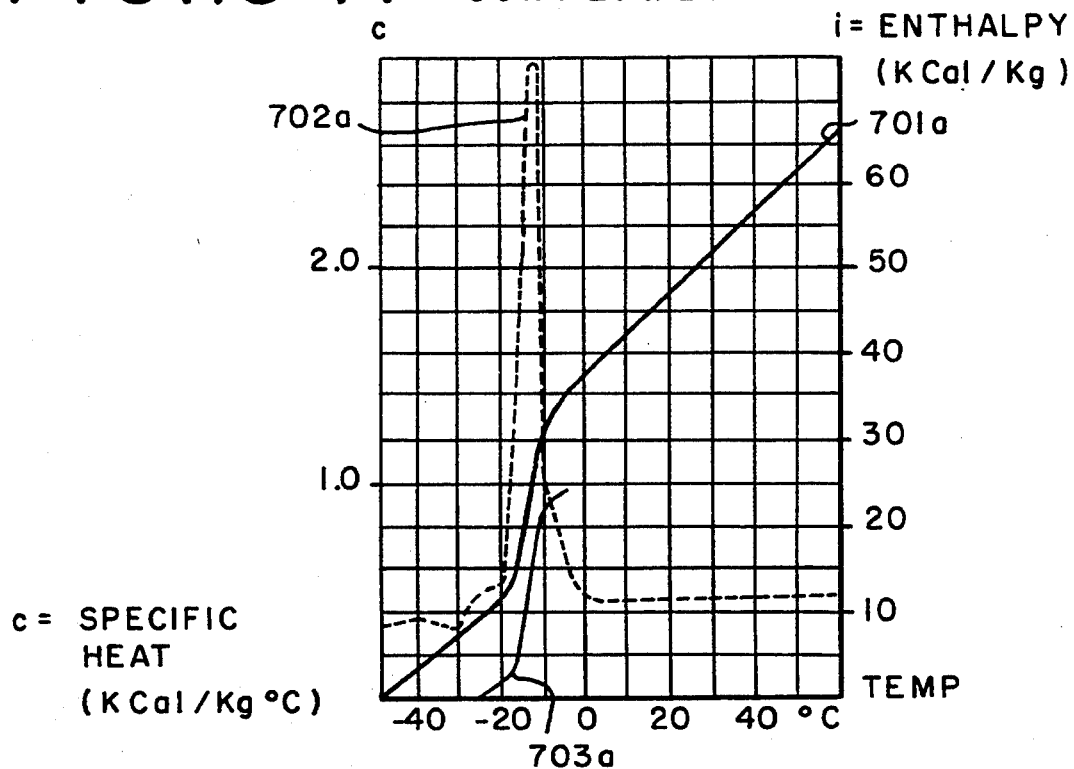
FIG.13-A SUNFLOWER
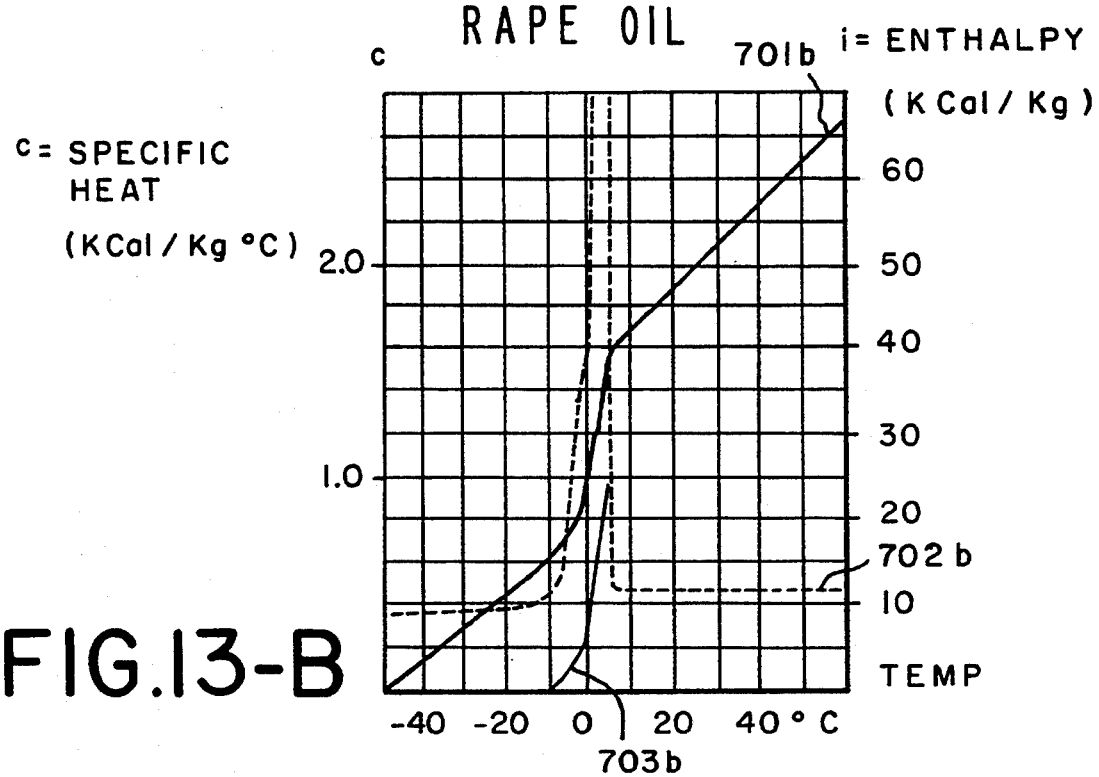
FIG.13-B RAPE OIL

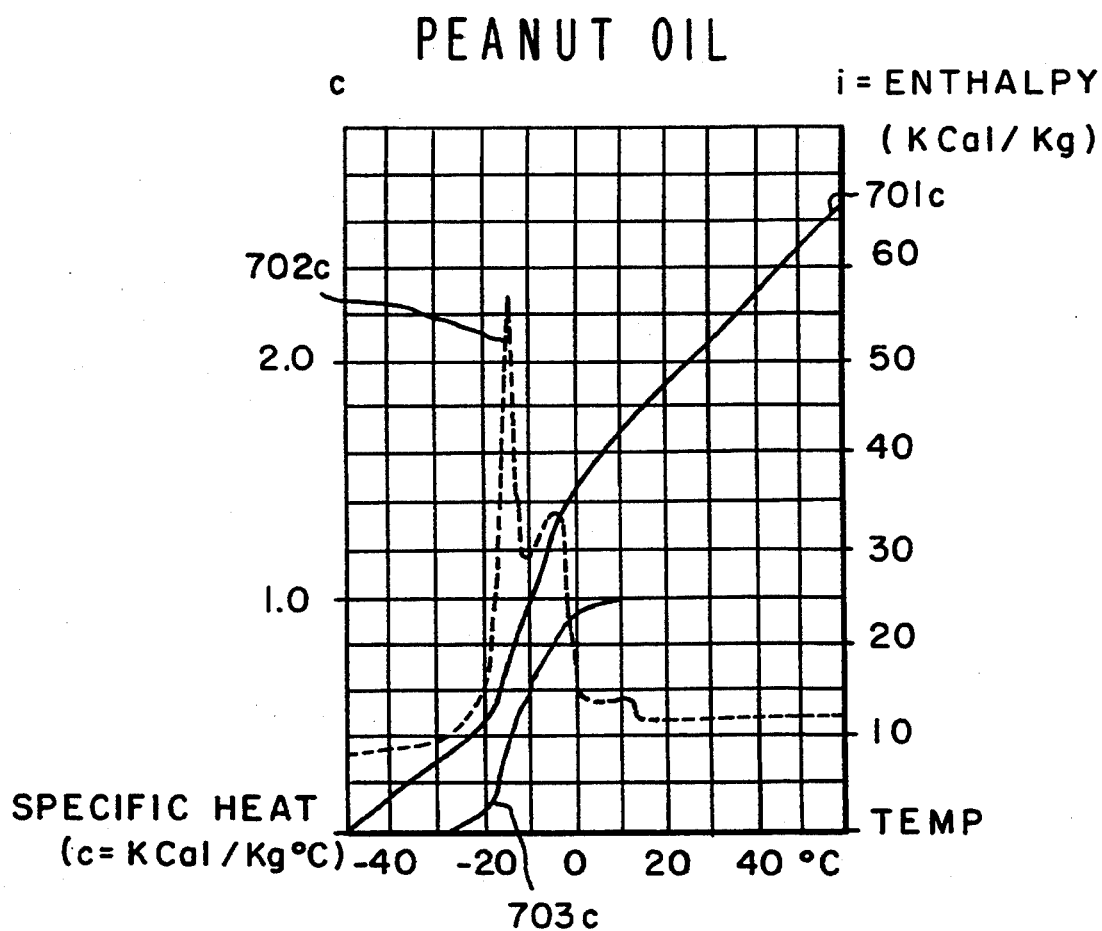

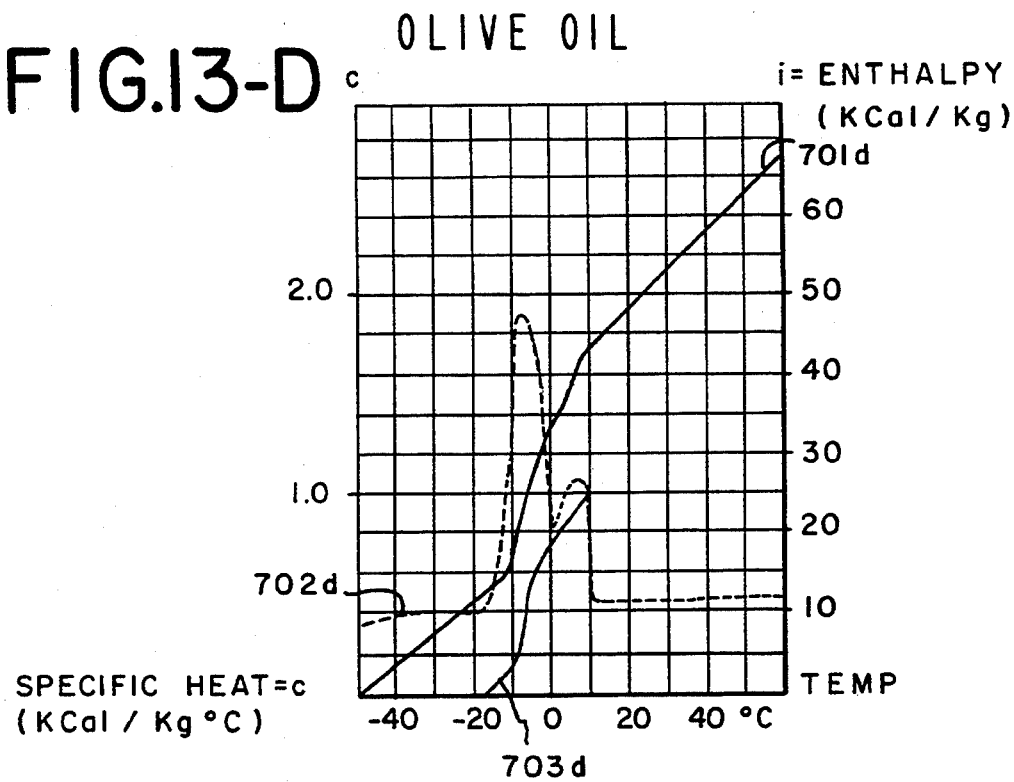
FIG.13-D
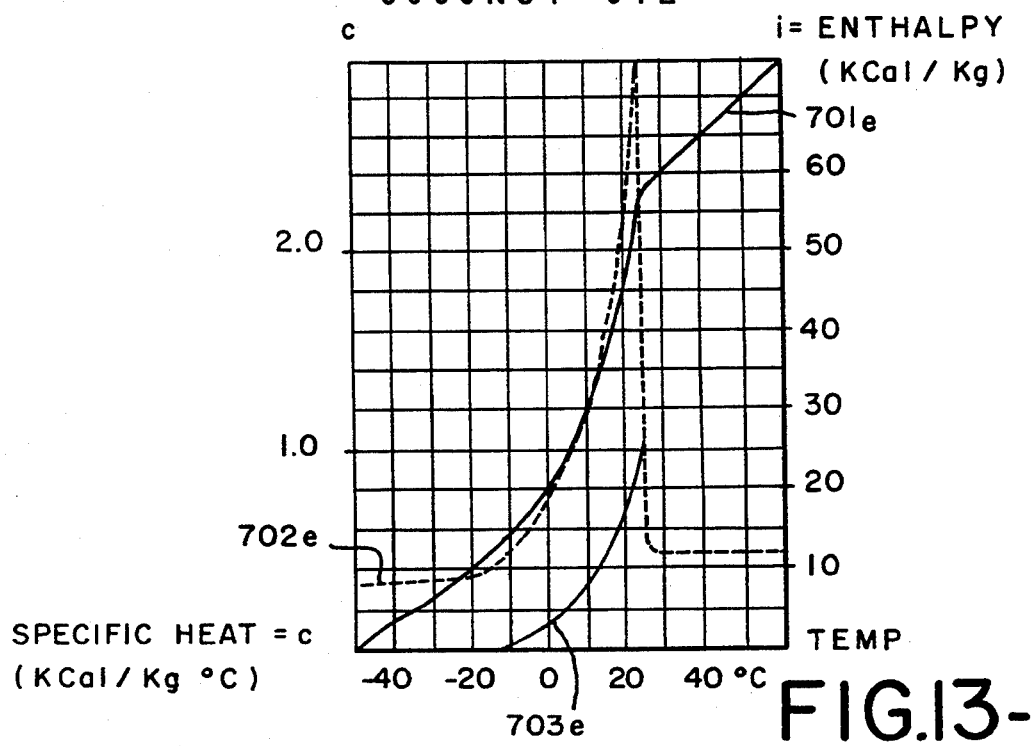
FIG.13-E

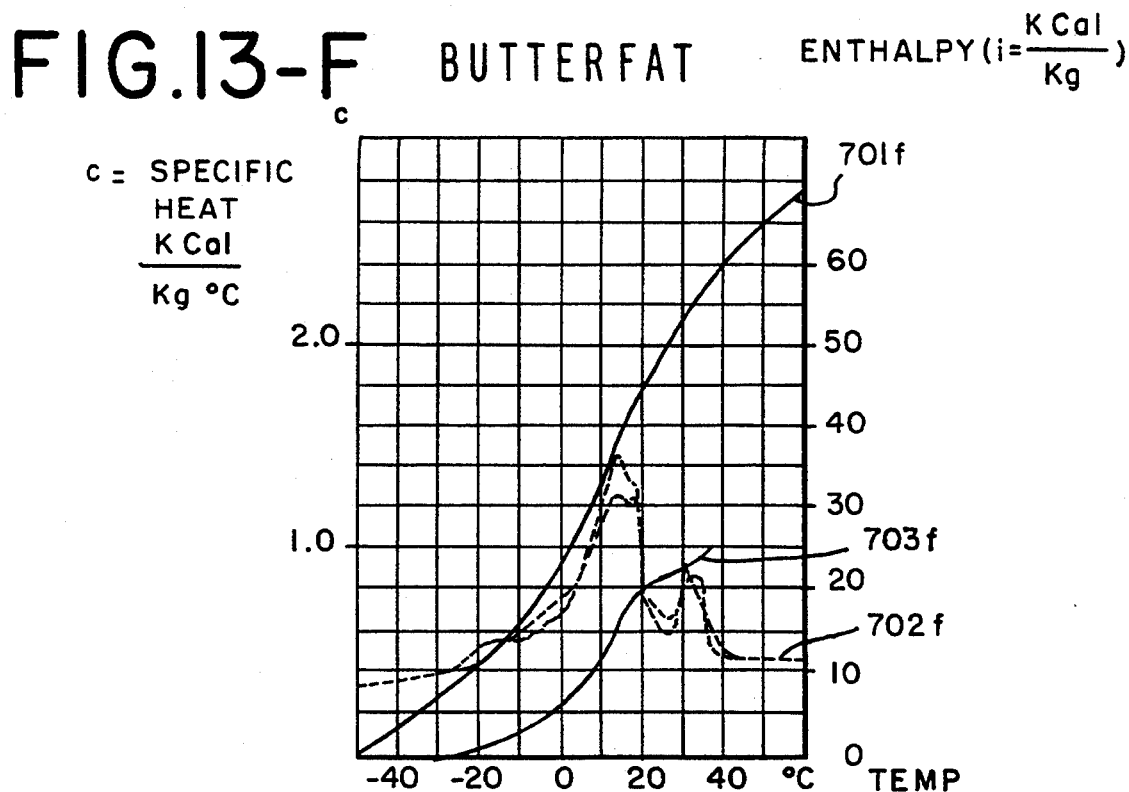
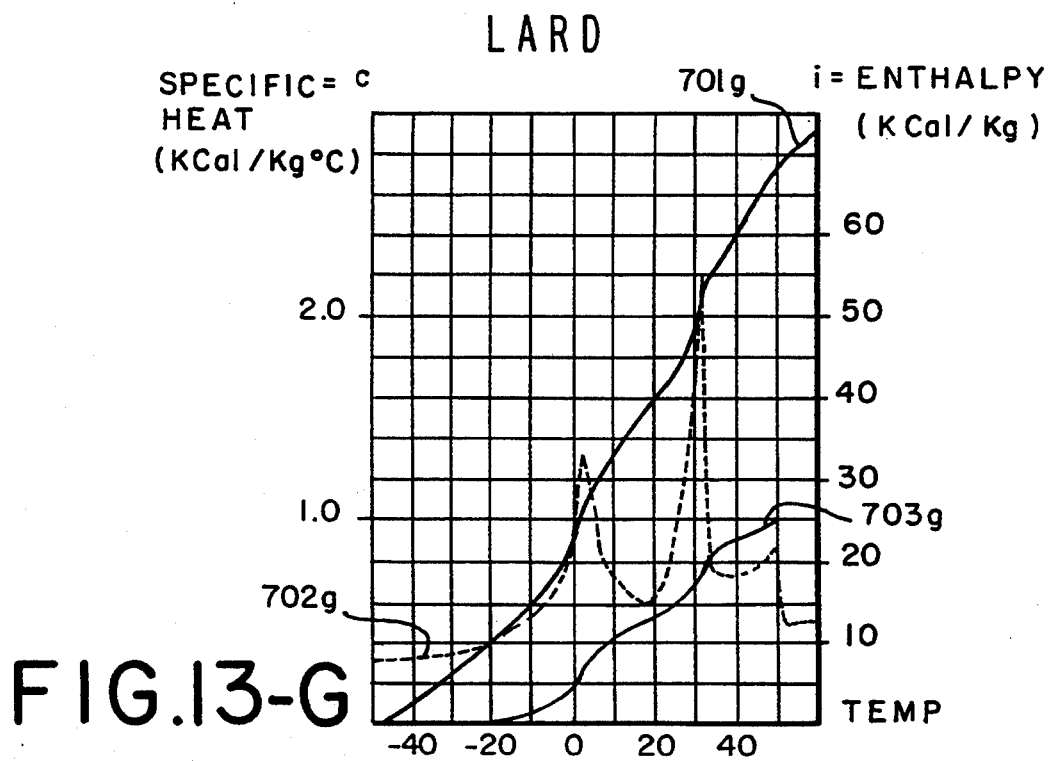

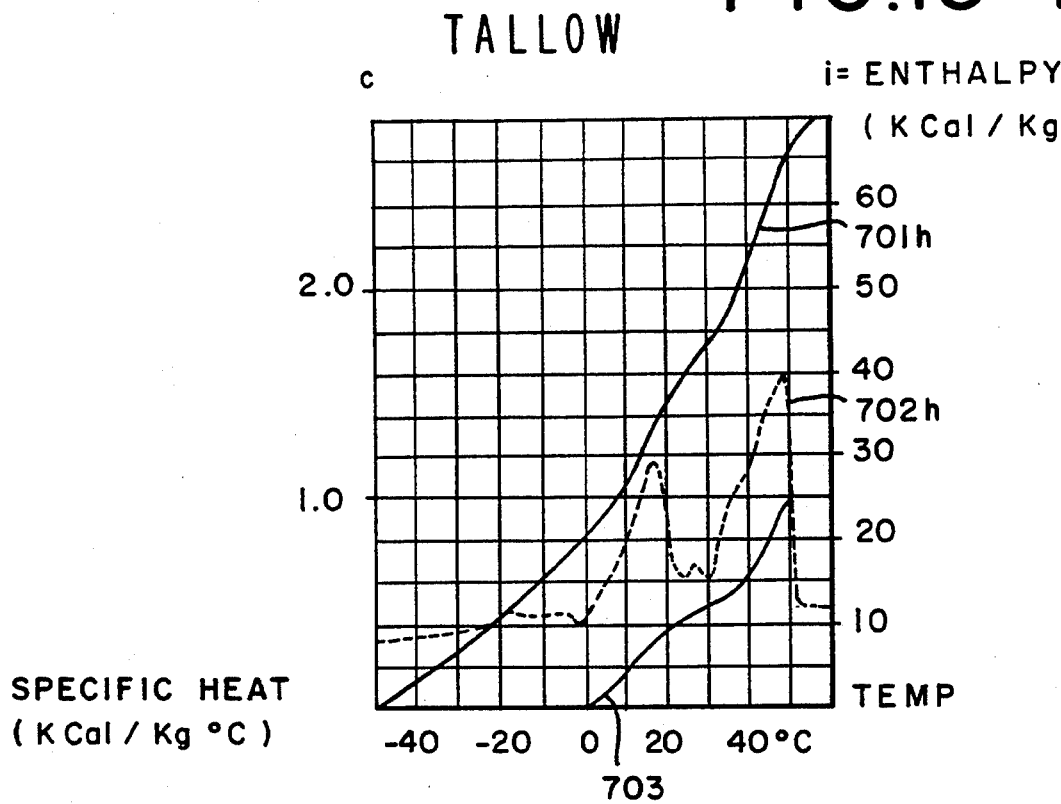
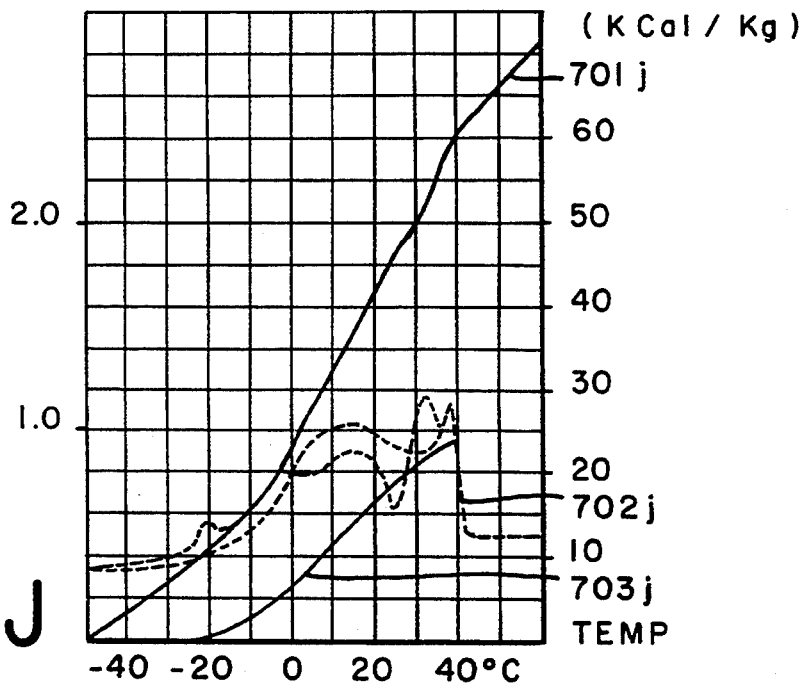

FLUIDIZING SPRAY CHILLING SYSTEM FOR PRODUCING ENCAPSULATED MATERIALS

INTRODUCTION AND BACKGROUND OF THE INVENTION

The present invention relates to a novel spray chilling system for producing controlled release flavoring and coloring agents. More particularly, the invention relates to apparatus and processes for obtaining generally solid flavoring and coloring agents which can be used to release flavors and aromas and coloring in a balanced manner, as for example, for foods.

There is increasingly a need for flavoring agents which provide for a controlled release of flavor during heating or other phases of pre-consumption preparation. Thus, in microwave cooking, because the cooking time is so short, there is not enough time for foodstuffs cooked in microwave ovens fully to develop their flavor. Accordingly, there is a pressing need for flavors which can be added to microwave foods to impart desirable flavors to the foods.

The flavor for addition to microwave foods for cooking in a microwave oven can be a finished typical flavor of that food product or it can comprise precursors which will produce the typical flavor of the food product during the short cooking time. When flavors are incorporated into foodstuffs destined for microwave cooking, the flavors added will be subjected to microwave heating as the food is cooked by microwave. This requires that the added flavor should be able to withstand the microwave heating. While the food is being cooked in the microwave oven, steam is internally generated inside the food, and a steam distillation effect also results. Therefore, the added flavor must be able to remain in the food and not be steam-distilled out.

Encapsulation of flavors has been used in the past. Such encapsulation sought to protect the flavor from oxidation, to prevent it from evaporating, and to convert flavor products in liquid form to solid form. Conventionally, hydrocolloids such as starch, dextrin, maltodextrin, gum arabic, gelatin, and the like are used as the carriers or the encapsulation agents. Products of this type of encapsulation are water-soluble. In the flavor industry, the most common procedures for producing encapsulation products are spray drying, and to a lesser extent, extrusion and coacervation techniques.

For producing water-insoluble products, it has been customary to coat spray-dried powder or some other solid form of the flavoring materials with fat or wax. The application of the fat coating is commonly done by fluidized bed coating or spray chilling. When a spray-dried powder is used as the core material, the process is called double encapsulation.

British patent 767,700 shows a method for making particles comprising encasing inner articles which contain a fat-insoluble vehicle carrying fat-soluble vitamins in a moisture-resistant substance in which the fat insoluble vehicle is insoluble. U.S. Pat. No. 3,186,909 relates to a method for melting a composition containing fatty alcohol esters derived from sperm whale oil, adjusting the composition to 90° C. adding urea to the composition and dissolving the urea, and adding fish liver oil and vitamins to prepare a homogeneous mixture. If U.S. Pat. No. 3,976,794 shows sweetened coconut products coated with a powdered sugar containing particles of sugar coated in edible fat. U.S. Pat. Nos. 3,949,094 and 3,949,096 show a process for preparing various flavorings, colorants, and flavor enhancers coated with various fats and emulsifiers, the process comprising spraying condiments which are intercepted by a second spray of certain edible coating materials. These prior art processes are capable of only putting limited quantities of flavor material into the finished product.

Except when spice powders or pure chemical powders, such as citric acid, ascorbic acid, and glucono-delta-lactone are used, the flavor loading in the fat-coated spray-dried powders is low, that is, the quantity of flavoring composition in the powder is relatively low. For example, in spray-dried flavor powders, the flavor loading is usually 20 percent. Extrusion encapsulated flavors usually have flavor loading of only 10 to 15 percent. When these powders have an additional coating on top of their original coating, the final loading of the flavor will be reduced still further. Depending on how much fat can be coated on the spray-dried powders, the flavor loading can drop to less than ten percent in double encapsulated powders. A flavor powder with only ten percent active flavor content is of lesser practical interest, unless the flavor is a very powerful one.

An improved process is described in U.S. Pat. No. 5,064,669 but the art has been further developing to obtain even greater benefits and improvements.

SUMMARY OF THE INVENTION

It is an object of the present invention to provide an apparatus for preparing encapsulated flavors from solid, liquid, or mixed flavors. The release of the flavors from the encapsulated product is through the use of various solid products that can be prepared by the apparatus of this invention.

The above and other objects of the invention can be achieved by an apparatus for forming spray chilled encapsulated food additives which contains the following components:

a) an upright vertically positioned enclosure enclosing a working three dimensional space. This enclosure has
   i) a vertical central axis;
   ii) an upper section surrounding the central axis;
   iii) a middle section surrounding the central axis vertically located below and immediately adjacent of the upper section; and
   iv) a lower section surrounding the central axis and vertically located below and immediately adjacent the middle section. Further, the enclosure has vertically enclosing sidewalls surrounding the central axis having;
   i) an inner vertical surface;
   ii) an upper circumferential edge atop of the upper section; and
   iii) a lower circumferential edge at the bottom and the lower section;
   iv) a top horizontally positioned lid supported by the vertically enclosing sidewalls of the enclosure and located on the upper circumferential edge having at least one gas exit orifice therethrough; and
   v) a base cover supporting the vertically enclosing sidewalls located on the lower circumferential edge having at least one solids exit orifice therethrough located within said lower section horizontally positioned in a first cross-sectional x-y plane.

There is also provided first compressed gas transmission means directing a first set of compressed gas molecules along substantially vertical directional vectors $V_{ia}$ from the lower section towards the upper section substantially adjacent the entire inside circumference of the vertically enclosing sidewalls located within the upper sections. Horizontally positioned second compressed gas transmission means are provided for directing a second set of compressed gas materials (5) along substantially vertical direction vectors $V_{ia}$ from said upper section towards said lower section and (ii) along a set of directional vectors $V_{ib}$ extending inwardly and downwardly from said upper section towards said central axis and said middle section at an angle $\Theta$ between said direction vectors $V_{ib}$ and said directional vectors $V_{ia}$. Solidifiable molten fluidic substance nozzle feeding means are provided for feeding solidificable molten fluid particles in a substantially vertical direction along directional vector $V_{fp}$ from said upper section towards said middle and lower sections.

The apparatus of the invention is used to carry out a process for preparing particulate flowable flavoring powders by heating a high melting point encapsulating or enrobing material, such as a fat and/or wax and one or more emulsifiers to melt this starting material; mixing one or more water-containing flavor compositions with a texture conditioning agent; mixing the flavor compositions and optional texture conditioning agents(s) with the molten fat or wax to obtain a homogeneous mixture in the form of an emulsion; and chilling the flavor composition-containing mixture to provide discrete particles of solid encapsulated flavoring agent. The powders of the discrete particles prepared according to the invention contain at least about ten percent of flavor composition.

The novel apparatus of this invention facilitates and enables the conversion of liquid, and particularly aqueous liquid, flavors to a readily usable powder form with both flavor oils and aqueous flavors. Flavors can contain up to 50 percent water. Most of the water is retained in the powder, and very importantly, the original fresh flavor is retained in the product. Moreover, the low temperatures permitted in the present processes cause little or no thermal damage to subtle flavor compositions. Generally, the flavor composition contains from about 15 to about 50 percent water, and in some preferred embodiments, from 30 to 50 percent water.

It has been found that the stability of the flavoring powders that can be prepared with the apparatus of this invention is comparable to that of the original flavor composition under the same storage conditions, so that the flavoring powders are stable, while at the same time remain capable of releasing the desired flavor when heated in the course of normal food preparation. No caking of the flavor powder has been noted, even with storage at temperatures as high has 122° F. (50° C.).

BRIEF DESCRIPTION OF DRAWINGS

The invention is further described with reference to the accompanying drawings wherein:

FIG. 9 is a top view of the fluid distribution ring;

FIG. 10A is a perspective view of the toroidal ring gas dispenser of the invention;

FIG. 10B is a cross-sectional view of a section of the toroidal ring shown in FIG. 10A;

FIG. 10C is a partial perspective view of another embodiment of the toroidal ring gas dispenser of the invention;

FIG. 10D is a partial view of the cross section of the toroidal ring shown in FIG. 10C;

FIG. 11 is schematic cross-sectional view of an apparatus according to the present invention;

FIG. 13A is a plot of specific heat and enthalpy versus temperature for sun flower oil;

FIG. 13B is a plot of specific heat and enthalpy versus temperature for rape seed oil;

FIG. 13C is a plot of specific heat and enthalpy versus temperature for peanut oil;

FIG. 13D is a plot of specific heat and enthalpy versus temperature for olive oil;

FIG. 13E is a plot of specific heat and enthalpy versus temperature for coconut oil;

FIG. 13F is a plot of specific heat and enthalpy versus temperature for butter fat;

FIG. 13G is a plot of specific heat and enthalpy versus temperature for lard;

FIG. 13H is a plot of specific heat and enthalpy versus temperature for tallow; and FIG. 13J is a plot of specific heat and enthalpy versus temperature for margarine.

DETAILED DESCRIPTION OF INVENTION

Figure 1:
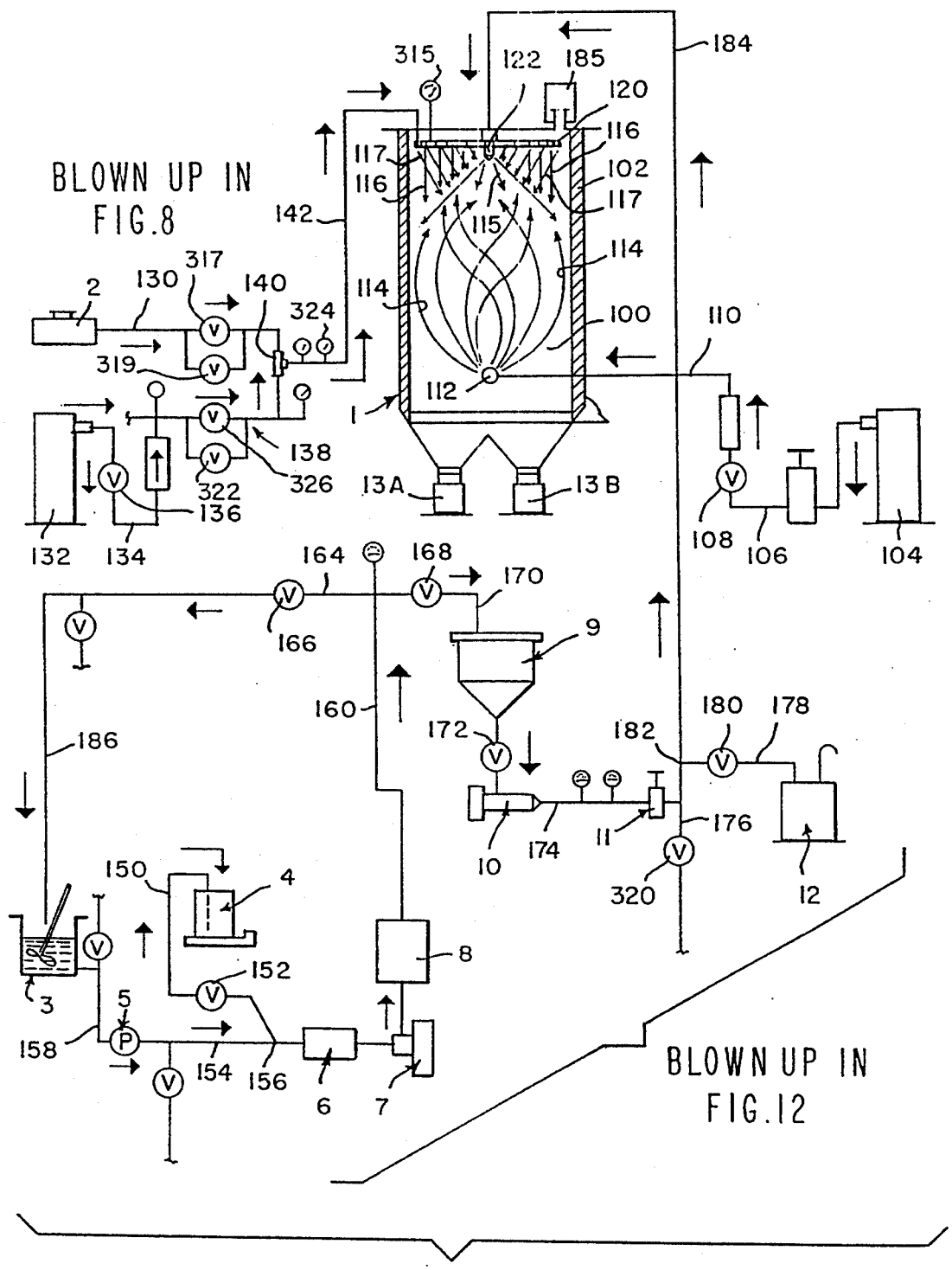
FIG. 1 is a flow diagram of processes for producing the solid flavoring particles in accordance with one aspect of the invention.

The apparatus of this invention is used in Fluidized Spray Chilling which is an encapsulation process of producing controlled released powder form products. This process itself is known in the art and has been proven in production scale (450 lb/hr) in the production of a number of innovative flavor, fragrance and other applications. The advantages of the fluidized spray chilling process using the apparatus of the include superior consistent product quality, ease of operation, ease of cleaning, high throughput, operation un-affected by the weather, compactness in space, safe and low operating cost.

Briefly summarized, the known process is divided into seven phases;
(1) raw material pre-melting phase,
(2) in-line blending/homogenization phase,
(3) chilling phase,
(4) atomization phase,
(5) fluidization phase, (6) product collection phase, and
(7) cleaning phase.

Each phase has a significant impact on the overall performance of the quality and efficiency of the system.

In the raw material pre-melting phase, carrier fat material/emulsifier and target encapsulating material were handled separately. An important design consideration was to minimize contact time between hot melt fat and target encapsulating material. Therefore, thermal damage or volatile loss can be minimized during the entire process. Fat and emulsifier were pre-melted in a scraped surfaced tank at 165°–180° F. Volatile or biologically active liquid form ingredients were stored in a low temperature controlled closed vessel. As for paste form material it can be pre-melted at its minimum pumpable temperature, for example, 100°–120° F. Both streams were pumped and ratio controlled by mass flow meters to maintain constant loading.

In the in-line blending/homogenization phase, hot pre-melt material was in-line injected with volatile or heat sensitive flavor and fragrance material at controlled ratios. The mixture was then passed through an in-line mixer and a one or three stage in-line homogenizer to form a uniform mixture. Temperature of the mixture prior to atomization is in the range of 160°–170° F. Since the volatile or heat sensitive material has a short residence time in contact with the hot carrier material, the finished produce has superior volatile retention. In addition, based upon microscopic examination, the kinetics of fat crystallization under liquid nitrogen form a tighter and smoother film to protect the volatile loss.

In the chilling phase, chilling media (for example, liquid nitrogen) was controlled with dry compressed air to reach the designed temperature. This mixture was sprayed concurrent towards the atomized droplets at a special pattern through a custom designed distribution system. (FIGS. 9 and 10A). Droplets were crystallized and co-gelled by the turbulent chilling media, leaving only solidified and encapsulated particles.

In the atomization phase, feed slurry is converted into a cloud of finely dispersed droplets, either two fluid nozzle or centrifugal nozzle, and concurrently discharged into the turbulent chilling media by cryogenic freezing. The resulting drastic increase in the surface area available for heat and mass transfer causes instant formation of a semi-permeable fat crystallized film. This film functions as a protective membrane in reducing the volatile loss. Therefore, residence time for internal heat transfer and further fat crystallization can proceed until droplets reaches their terminal velocity.

In the fluidization phase, a separate compressed air stream is introduced from the bottom of the chilling chamber. This controlled flow and pressure jet stream forms a centrifugal fluidization flow toward the downward flowing disintegrated droplets. As these droplets reach their terminal velocities, this vertical and tangential velocity through the cross section of the chamber has a great influence on the efficiency of the process. It forces a change in the powder flow pattern, and back-mixes the chilling media in the chamber. As a result, powders have longer residence time in contact with the chilling media to prevent wall built-up. Also, this counter-current jet flow promotes turbulence for the atomization zone that astronomically increases simultaneous heat, mass, and momentum transfer rates. In comparing of the size of equipment, the system has high throughput (capacity) among all other spray drying or spray chilling equipment.

In the product collection phase, solidified and encapsulated particles leave from an attached vibrator. This vibrating force also transmits to the material in the chamber wall to prevent wall build up. The exhaust gas is discharged through the top of the chilling chamber.

In the cleaning phase, the straight chamber design without cyclone and few dead spots simplifies the cleaning step, minimizing the loss of small powder particles. CIP nozzle enables reduced cleaning time and simplifies the cleaning procedures. These features reduce the operating cost, and prevents the steam release of odors during cleaning.

These are a number of engineering considerations for the design of a fluidized spray chiller including the following:

1. to obtain optimum utilization of the total chilling capacity;
2. to reduce volatile and heat transfer losses to the surrounding atmosphere to a minimum;
3. to control the chilling media temperature and discharge product temperature to yield consistent quality; and
4. to ease cleaning procedure for frequent changing batches.

In this invention, design and control factors of the fluidized process system are based upon mathematical models that simultaneously applies balance, kinetic and transport equations. The flow diagram of the process design of the fluidized spray chilling system is shown in FIG. 1.

Figures 6, 7:
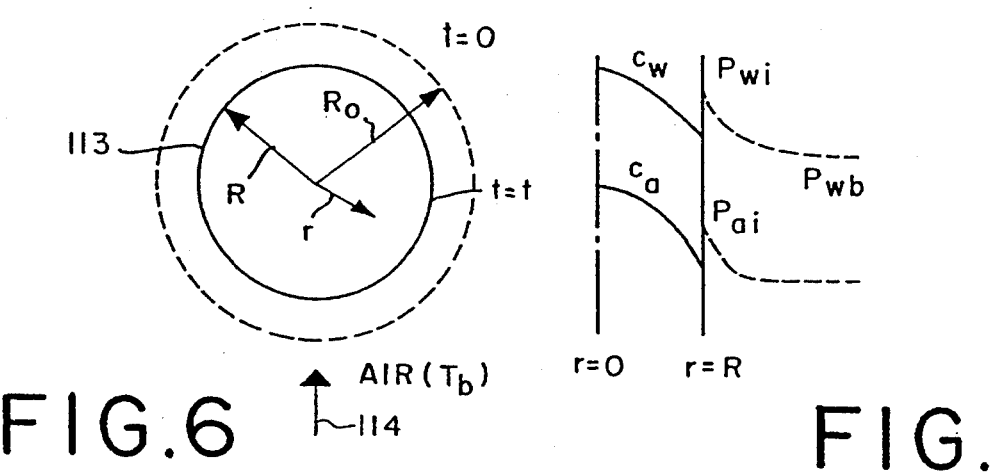
FIG. 6 is a schematic representative of a particle formed in practicing the invention.
FIG. 7 is a graph of the pressure produced with cooling.

FIG. 6 shows an illustration of a droplet solidified in chilled air of a constant temperature. The initial radius of the droplet is $R_o$ and it shrinks to R at time t because of the loss of volatiles contained in it. For simplicity, it postulated that;

i) the droplet consists of three components water, melt fat and is a trace amount of a flavor component, ii) these components are transferred only by molecular diffusion, iii) the additivity of volume yields among them, and iv) no bubbles or crystals appear during chilling.

Then, the equations governing the movement of the moisture and flavor components are obtained by thermodynamics of irreversible process. These equations have been formulated by Kerkhof and Schoeber (1974) as follows:

$$\frac{\partial c_w}{\partial t} = \frac{1}{r^2} \frac{\partial}{\partial r}\left(D_w r^2 \frac{\partial c_w}{\partial r}\right) \quad (1)$$

$$\frac{\partial c_a}{\partial t} = \frac{1}{r^2} \frac{\partial}{\partial r}\left\{r^2\left(D_a \frac{\partial c_a}{\partial r} + D_{wa}\frac{\partial c_w}{\partial r}\right)\right\} \quad (2)$$

The heat balance on the droplet gives the equation of change for the droplet temperatures as:

$$(C_{pm}/4\Pi R^2)dT_m/dt = h_g(T_b - T_m) - k_g(p_{wi} - p_{wb})\gamma_w \quad (3)$$

where $C_{pm}$ is the specific heat capacity of the droplet which is given by the following equation.

$$C_{pm} = \frac{4}{3}\pi R_0^3 C_{ps} c_{s0} + C_w[c_{w0} - p_w(1 - R^3/R_0^3)] \quad (4)$$

The initial and boundary conditions of Eqs (1) and (2) are as follows:

$$\left.\begin{array}{l} t = 0, \ 0 \leq r \leq R_0; \ c_w = c_{w0}, \ c_a = c_{a0}, \ T_m = T_{m0} \\ t > 0, \ r = 0: \partial c_w/\partial r = 0, \ \partial c_a/\partial r = 0 \\ r = R; \ \dfrac{-D_w}{1 - c_w\ _w} \dfrac{\partial c_w}{\partial r} = k_{gw}(p_{wi} - p_{wb}) \\ -D_a\left(\dfrac{\partial c_a}{\partial r} + c_a\dfrac{\partial \ln H_a}{\partial c_w}\dfrac{\partial c_w}{\partial r}\right) = k_{ga}'(p_{ai} - p_{ab}) \end{array}\right\} \quad (5)$$

The diffusion coefficient of $D_{wa}$ appears at the right hand side in Eq (2) is so-called "cross diffusion coefficient" which is emerged in the process of derivation of Eq. (2) by thermodynamics of irreversible process. Physically, the term $D_{wa}(\delta c_w/\delta r)$ indicates the amount of the flavor component transferred by the moisture concentration gradient. Kerkhof and Schoeber (1974) showed that the coefficient $D_{wa}$ could be derived by diffusion coefficients of water $D_w$ and flavor component $D_a$ as follows:

$$D_{wa} = D_a D_a (\delta \ln H_a/\delta c_w) - D_w \overline{V_w}/(1 - c_w \overline{v_w})\} \quad (6)$$

where $H_a$ is the modified activity coefficient of the flavor component which is related to the activity $A_a$ as:

$$A_a = H_a C_a \quad (7)$$

Chandrasekaran and King (1972) and Tsujimoto, Matsuno and Toei (1982) showed that $H_a$ was the function of moisture content only. As is indicated in FIG. 1, the droplet shrinks during drying. Therefore, it is very difficult to solve Eqs. (1), (2) and (3) numerically under the fixed coordinate of r. In this case, substantial coordinate $\sigma$, which was used by Kerkhof and Schoeber (1974) and Wakabayashi, Yamaguchi, Matsumoto and Mita (1977), was applied to Eqs. (1) and (2) in place of r-coordinate. The coordinate $\sigma$ is defines as:

$$\sigma = \int_0^r c_s \overline{v_s} r^2 dr \quad (8)$$

Introducing new variables $u_w = c_w \overline{v_w}/c_s \overline{v_s}$ and $u_a = -c_a/c_s \overline{v_s}$ instead of $c_w$ and $c_a$, we can rewrite Eqs. (1) and (2) as follows:

$$\frac{\partial u_w}{\partial t} = \frac{\partial}{\partial \sigma}\left\{\frac{r^4 D_w}{(1+\mu_w)^2}\frac{\partial u_w}{\partial \sigma}\right\} \quad (9)$$

$$\frac{\partial u_a}{\partial t} = \frac{\partial}{\partial \sigma}\frac{r^4}{(1+u_w)^2}\left\{D\frac{\partial u_a}{\partial \sigma} + \frac{1}{1+u_w}\left[\frac{\overline{v_a}}{\overline{v_w}}D_{wa} + u_a(D_w - D_a)\right]\frac{\partial u_a}{\partial \sigma}\right\} \quad (10)$$

Furthermore, Eq. (4) becomes $$\left.\begin{array}{l} t=0, \ 0 \leq \sigma \leq \sigma 0; \ u_w = u_{w0}, \ u_a = u_{a0}, \ T_m - T_{m0} \\ t > 0, \ \sigma = 0; \ \partial u_w/\partial \sigma = 0, \ \partial u_a/\partial \sigma = 0 \\ \sigma = \sigma_0; \ -\dfrac{D_w}{(1+u_w)^2}\dfrac{R^2}{\sigma_0 \overline{v_w}}\dfrac{\partial u_w}{\partial \sigma} = k_{gw}(p_{wi} - p_{wb}) - \\ \dfrac{D_a}{(1+u_w)^2}\dfrac{R^2}{\sigma_0 \overline{v_w}}\dfrac{\partial u_a}{\partial \sigma} - \dfrac{u_a}{1+u_w}\left\{1 - \dfrac{1}{\overline{v_w}(1+u_w)}\dfrac{\partial \ln H_a}{\partial c_w}\right\}\dfrac{\partial u_w}{\partial \sigma} = k_{ga}(p_{ai} - p_{ab}) \end{array}\right\} \quad (11)$$

where $\sigma_o\left\{=\int_0^r c_s \overline{v_s} r^2 dr\right\}$ is the total volume of the dissolved solid and is invariant during chilling. The amounts of flavor component and moisture retained at any time in the droplet can be obtained as follows.

$$\psi + \frac{3}{R_0^3 c_{s0}^{v_a}}\int_0^\sigma u_a d\sigma, \ \psi_w = \frac{3}{R_0^3 c_{s0}^{v_w}}\int_0^\sigma u_w d\sigma \quad (12)$$

Crank-Nicolson's implicit method was applied to solve Eqs. (9) to (11). Dependence of diffusion coefficients $D_w$ and $D_a$, and of activation energies $E_w$ and $E_a$ on water content are formulated by polynomial equations of weight fraction of melt fat mass transfer coefficients are given by well known equations proposed by Ranz and Marshal (1952).

Modified plank equations for freezing time is:

$$t_f = \frac{\Delta H}{EHTD\Delta T}\left[P\frac{D}{h} + R\frac{D^2}{K_s}\right]$$

$t_f$=time to freeze the external layer of droplet
$\Delta T$ =The difference between the heat transfer (freezing) medium temperature and the temperature of freezing of the droplet
D: The radius of the droplet
h: The overall heat transfer coefficient from medium to droplet surface
ks: thermal conductivity of frozen droplet
P, R: and EHTD (Equivalent heat transfer dimensionality) are geometrical factors dependent on resistance to heat transfer and the shape of the droplet
$\Delta H$: enthalpy change which arises due to freezing
The nozzle exit velocity for a pressure flow nozzle can be calculated.
The nozzle exit velocity is one of the key factors affecting the spray formation.
For the calculation of the exist velocity it is necessary to make the following assumptions:

1. The calculation is valid for the pressure flow nozzle as depicted in the drawings herein.
2. Stationary liquid flow is considered.
3. Orifice diameter does not exceed 2 mm.
4. the fluid is Newtonian Bernoulli's equation for flow between positions 1 and 2 can be written as $$\frac{p_1}{\rho_L} + \frac{u_1^2}{2} = \frac{p_2}{\rho_L} + \frac{u_2^2}{2} + \zeta \frac{u_2^2}{2} \tag{A}$$

Thus, the outlet velocity can be expressed as follows:

$$u_2 = \phi \left( 2 \frac{p_1 - p_2}{\rho_L} + u_1^2 \right)^{0.5} \tag{B}$$

where is velocity coefficient. For liquids, is usually determined experimentally and its values range from 0.9 to 0.99.

Equation (A) and (B) are valid for ideal Newtonian liquids and they do not include any physical parameters of the sprayed liquid.

In case of atomization of food and chemical materials whose properties are far from those considered for ideal liquids, it is useful to express the outlet velocity in terms of the liquid properties. Most of the solutions to be dried are usually preconcentrated up to the level of 50% dry matter content. Under these conditions the concentrates are highly viscous and it is safe to say that approximately 70% of these materials can be classified as non-Newtonian ones. Velocity calculation for these liquids has to be approached in a different way. Liquid disintegration mechanism is based on the following relationship which has been derived from experiments.

$$We = 266 \, z^{0.133} \left( \frac{\rho_L}{\rho_a} \right)^{-0.8} \tag{C}$$

We, Z and Re are defined by equations (1), (2), (3) shown below $u_L'$, is the critical liquid velocity at which the atomization begins, is substituted for $u_L'$. Upon substituting $u_L$, into (C) we can obtain the following expression:

$$u_L' = 16.31 \frac{\sigma_L^{0.434} \rho_L^{0.967}}{d_n^{0.567} \rho_a^{-0.4}} \mu_L^{0.133} \tag{D}$$

This equation enables calculation of the critical velocity of a Newtonian liquid by means of liquid properties and nozzle diameter. In the case of non-Newtonian liquids, Eq. (D) has to be rearranged by applying an apparent viscosity. It is feasible to assume that the non-Newtonian liquid is a pseudoplastic one since in industrial practice this is the most common fact. Such a liquid follows the well-known power law instead of Newton's law:

$$\tau = \mu \dot\gamma \quad \text{Newton's Law} \tag{E}$$

where the dynamic viscosity is a parameter of the liquid. The power law is expressed as $$\tau = K\dot\gamma^n \tag{F}$$

where the consistency coefficient K and the flow index n are $$\mu_{ap} = \frac{\tau_w}{\dot\gamma_w} \tag{G}$$

where $\tau_w$ is the shear stress at the wall and $\dot\gamma_w$ is the shear rate at the wall For a power law fluid in tube flow $$\tau_w = K\dot\gamma_w^n \tag{H}$$

and $$\dot\gamma_w = \frac{3n+1}{4n} D_w \tag{I}$$

so that $$\tau_w = K \left( \frac{3n+1}{4n} \right)^n D_w^n \tag{J}$$

Substituting (J) into (G) we obtain $$\mu_{ap} = K \left( \frac{3n+1}{4n} D_w \right)^{n-1} \tag{K}$$

The quantity $D_w$ can be calculated directly using the liquid flow rate and nozzle diameter $$D_w = \frac{32 \dot Q_L}{\pi d_n^3} \tag{L}$$

Thus, the apparent viscosity from eq. (K) is $$\mu_{ap} = K \left[ \left( \frac{3n+1}{4n} \right) \left( \frac{32 \dot Q_L}{\pi d_n^3} \right) \right]^{n-1} \tag{M}$$

Ohnesorg attempted to correlate the liquid break up in terms of the Reynolds number, dimensionless number Z, which is expressed as a ratio of the Reynolds and Weber numbers:

$$Re = \frac{u_L d_n \rho_L}{\mu_L} \tag{1}$$

$$We = \frac{\rho_L d_n u_L^2}{\sigma_L} \tag{2}$$

$$z = \frac{We}{Re^2} = \frac{\mu_L^2}{\sigma_L \rho_L d_n} \tag{3}$$

The apparent viscosity is a very useful quantity which enables comparison between Newtonian and non-Newtonian fluids under the same flow conditions, i.e., identical shear rates. It can be also applied in various momentum and heat transfer relations replacing dynamic viscosity.

For nozzle atomization, the apparent viscosity is substituted in eq.(D) so that the critical exit velocity can be calculated for the pressure nozzle and pseudoplastic liquid:

$$u_{LNN} = 16.31 \left( \frac{\sigma_L^{0.434}\, \rho_L^{0.967}}{d_n^{0.567}\, \rho_a^{-0.4}} \right) \left[ K \left( \frac{3n+1}{4n} \right)^n - \right. \tag{N}$$

-continued $$1\left(\frac{32\dot{Q}_L}{x\,\phi_n^3}\right)^{n-1}\right]^{0.133}$$

Calculation of exit velocity for the pressure swirl nozzle
From the continuity equation it follows that $$x\left(\frac{d_1}{2}\right)^2 u_l = 2x\left(\frac{d_n}{2}\right)^2 b\, u_{ax} \quad (O)$$

The inlet velocity of feed liquid can be calculated as $$u_l = \frac{\dot{Q}_L}{S_1} = \frac{\dot{M}_L}{2x\,(d_1/2)^2\,\rho_L} \quad (P)$$

The axial outlet velocity $U_{ax}$ is calculated from eq. (O) as $$u_{ax} = \frac{d_1}{d_n\,b}\,u_1 \quad (Q)$$

and radial outlet velocity is given by $$u_{rad} = \frac{d_2}{d_n}\,u_1 \quad (R)$$

Upon rearranging these equations, we obtain the resulting expression for the outlet liquid velocity:

$$u_2 = (u_{rad}^2 + u_{ax}^2)^{0.5} \quad (S)$$

that is, $$u_2 = \left[\left(\frac{\dot{M}_L}{x\,b\,\rho_L\,\phi_n}\right)^2 + \left(\frac{\dot{M}_L\,d_2}{x\,d_1\,d_n\,\rho_L}\right)^2\right]^{0.5}$$

The energy dissipation is neglected in this derivation. Equation (2) can be applied for both Newtonian and non-Newtonian liquids.

There are two distinct regimes are visualized in the spray chilling chamber. The first zone is the nozzle zone where droplets decelerate from high initial release velocity to radial velocity. The second zone is the fluidization zone where droplets are entrained by the tangential swirling air jet from the chamber bottom. The droplet motion is mainly influenced by both chilling medium and tangential air flow dynamics of the air.

Tangential fluidization gives easy material transport, high rates of transfer while preventing local un-even distribution.

The process kinetics of chilling a given product are determined from experimental chilling rate data, i.e. kinetics of fat crystallization under controlled conditions. Other important properties are fluidization gas velocity, fluidization point (i.e. particle size distribution below which fluidization is possible), and heat transfer coefficient for immersed chilling surface.

Compared with spray drying, Kieckbusch and King (1979) reported large volatile losses (usually more than 50% of the total volatile present) within 10 cm of the centrifugal pressure atomizer. Their calculation indicated that, once drops were formed, the aroma losses were entirely liquid phase controlled. Their findings complied with the selective diffusion theory by Thijssen and micro-region theory by King.

Based on this theory and their experimental results, we designed this system to minimize loss in the atomization step by intensifying the rate of liquid droplet solidification near the atomization. We designed a special sparger ring (FIG. 9) with a nozzle directed toward the entire droplet break-up zone. By using dynamic disperse low temperature chilling medium (consisting a mixture of liquid nitrogen and compressed air) circulating around the entire chamber, volatile loss in spray drying can be almost prevented in our fluidized spray chilling process. This unique sparger ring design can enhance heat, mass, and momentum transfer rates between the chilling medium and hot atomized droplets. Thus a uniform chilling temperature around the atomization zone quenches the atomized liquid droplets immediately. By adjusting separate compressed air and liquid nitrogen pressures and flows through an ejector, the spray chiller can provide a different chilling temperature and capacity for the atomization zone. As a result, each encapsulated product can be processed under its optimum temperature and throughput, according to their material properties and heat sensitivity.

In addition to the selective diffusion theory, influences of the volatile behavior during the chilling process can be attributed to the droplet trajectory in fluidization. For the calculation of the droplet trajectory knowledge is required of the air flow pattern in the dryer, as-well as the drag forces exerted on the particles.

This new system allows use of the spray chill for highly volatile flavor and fragrance materials of liquid, paste or powder at wide loading level. Using a typical sour cream flavor as an example, with sensory evaluation, it was discovered that the new process has improved 50% in strength as compared to the regular product. After examination of the product under a microscope (See FIG. 13), it was found that low chilling temperature can affect not only kinetics of fat crystallization, but also form different types of thin film around the droplet. Based upon the selective diffusion theory, this film can cause drastic differences in the quality of the microencapsulation product.

This new system allows spray chill of highly heat sensitive biological material to form an immobilized form.

Also, this new system allows a spray chill of spray dry powder, or other powder type flavorings.

Still further this new system allows the production of new control-release conventional pesticides, semiochemicals such as pheromone, natural products, living microbial pesticides, and newer, more liable material.

FIG. 1 shows a fluidized spray chiller system in accordance with the present invention in a schematic flow diagram. The fluidizer spray chiller 1 is formed of upstanding wall 102 and is fitted with toroidal spray ring 120 which in turn is fitted with a central spray nozzle 122. Liquid nitrogen or liquid carbon dioxide is fed from source 2 through line 130 and valve 317 and by-pass valve 319 through mixing device 140 in line 142 to the top of manifold 120. Pressure gauge devices 324 determine the pressure in the system. Compressed air from source 132 is fed in line 134 metered by valves 136, 320, and 326 and conveyed by line 138 to mixing device 140. Gaseous components flow from the manifold 120 as indicated by the flow lines 116 and 117 in a downward direction. The path of the product which is introduced through nozzle 122 is indicated by the arrows 115.

Compressed air from feed source 104 is conveyed through line 106 through valve 108 into line 110 through the air inlet 112. The stream of air is indicated by arrows 114. Exhaust is provided through vent 185 at the top of the apparatus.

Product recovery is obtained in contains 13A and 13B.

Jacketed tank 3 is provided with a stirring device for feeding the eventual product to the manifold 120. The liquidified product is conveyed by line 158 through positive displacement pump or other similar pumping means 5 along line 154 to the point of entry 156 of the closed flavoring feed tank 4. The flavoring tank flows through line 150 and valve 152 and converges with the product line at point 156. The static cutter or mixer 6 is in line 154 and leads to in line homogenizer 7. A mass flow meter 8 is inserted in line 160. Recycle is permitted through line 116 and is controlled by valve 166 into line 186 for return to jacketed tank 3.

Valve 168 permits flow of product into line 170 for conveying to jacketed balancing tank 9. Product flowing out of tank 9 proceeds through valve 172 and into progressive cavity pump 10. Thereafter, the product is conveyed along line 174 to strainer 11 and then into the flow line 184. Valve 320 permits bleeding of the line. At point 182 pressure release tank 12 is attached through line 178 and valve 180 to complete the system.

Figure 2:
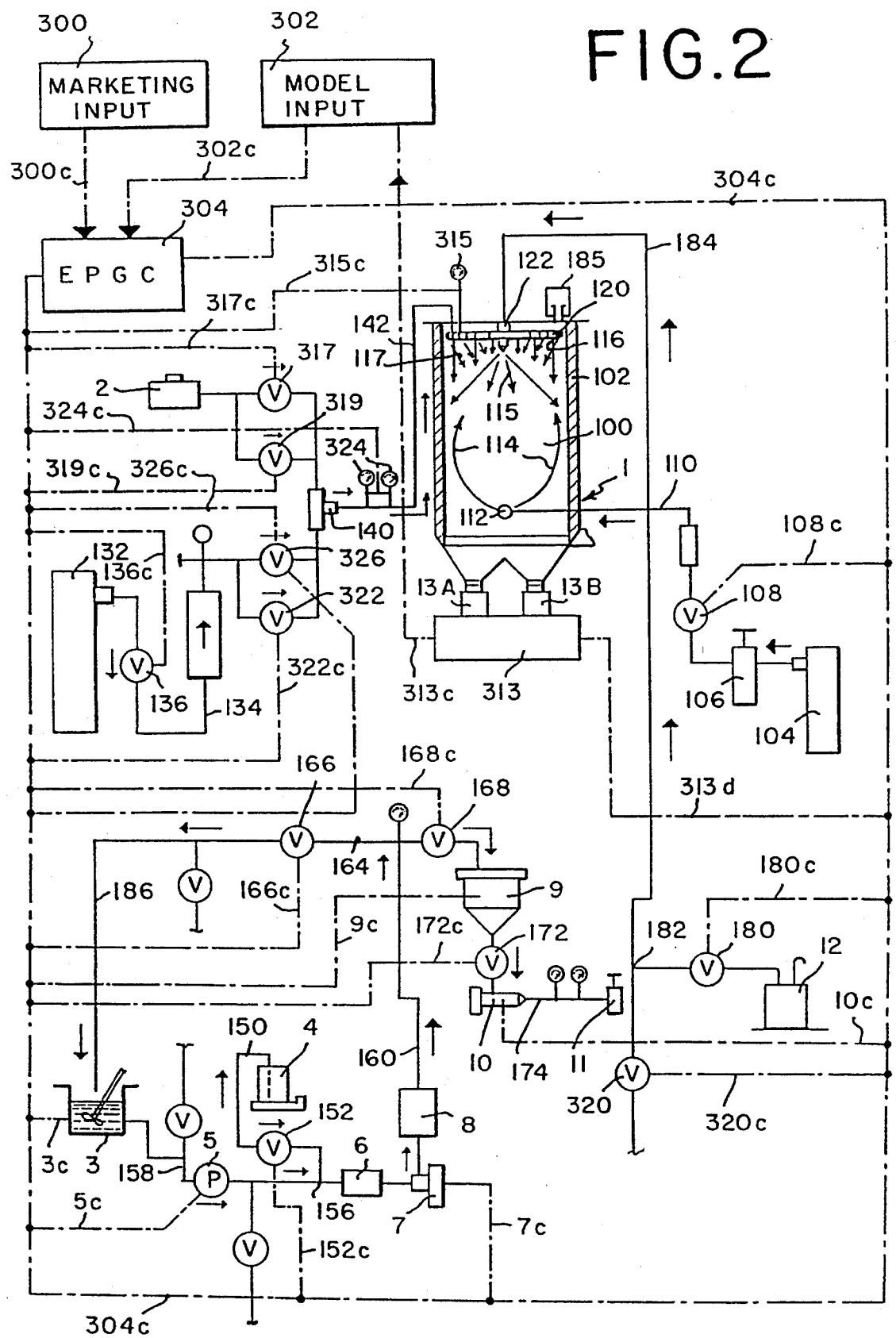
FIG. 2 is a flow diagram according to another aspect of the invention.

FIG. 2 is a flow diagram having superimposed a diagram showing computer connections for providing marketing input 300 and model input 302 through lines 300C and 302C, respectively. Control is provided by the computer at 304. In FIG. 2, the designator "c" indicates the computer connections whereby control is achieved in the overall operation of the system of the invention.

Figure 3:
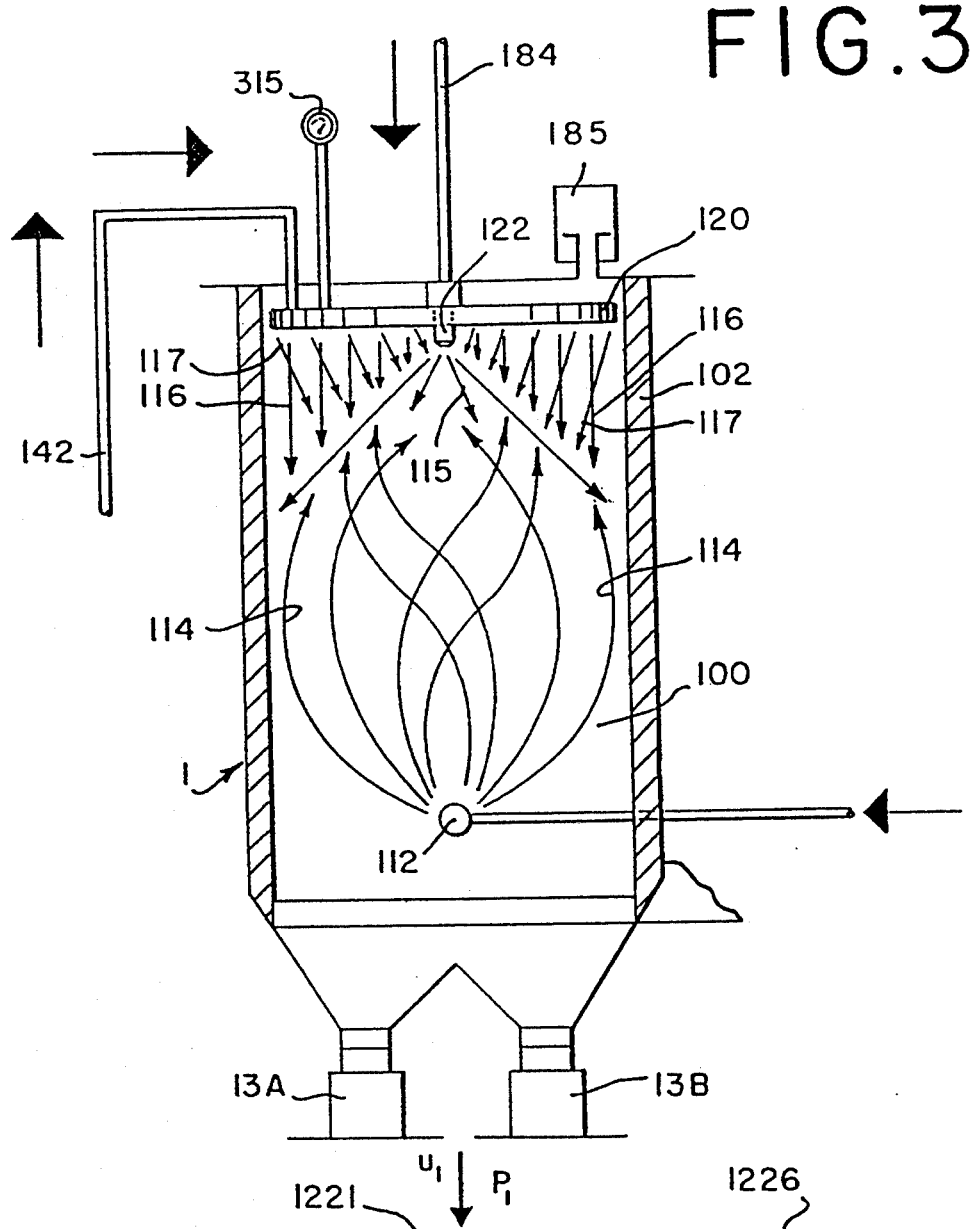
FIG. 3 is a partial cross section of a modified spray chill apparatus showing vectors according the present invention.

FIG. 3 shows the fluidizied spray chilling apparatus tank. Enclosure 1 is provided with upstanding vertical walls 102 and fitted with the conduit for product introduction through line 184 through manifold 120 and spray nozzle 122. The gases enter the manifold sparger 120 through line 142. Gases are introduced into the system in a vertically downward direction 116 and also at an angle 117. Compressed air is introduced through an appropriate injector 112 and travels upwardly 114 into the downward stream 115 of the product. Excess gases are vented through 185. The pressure is controlled by a valve 315.

Product is recovered selectively at 13A and 13B.

Figure 4:
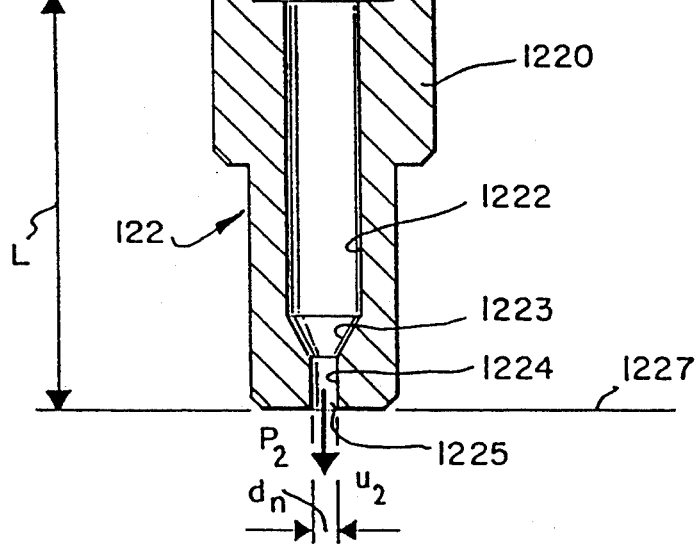
FIG. 4 is a cross section of the spray nozzle according to the invention.

FIG. 4 shows a cross section of a suitable spray nozzle of the invention showing the inlet side 1221, the top of the nozzle 1226, the bottom end of the nozzle 1227, the opening 1225 and the interior wall 1222, the tapering section 1223 and the final straight section 1224. The diameter of the opening at 1225 is indicated by $d_n$.

Figure 5:
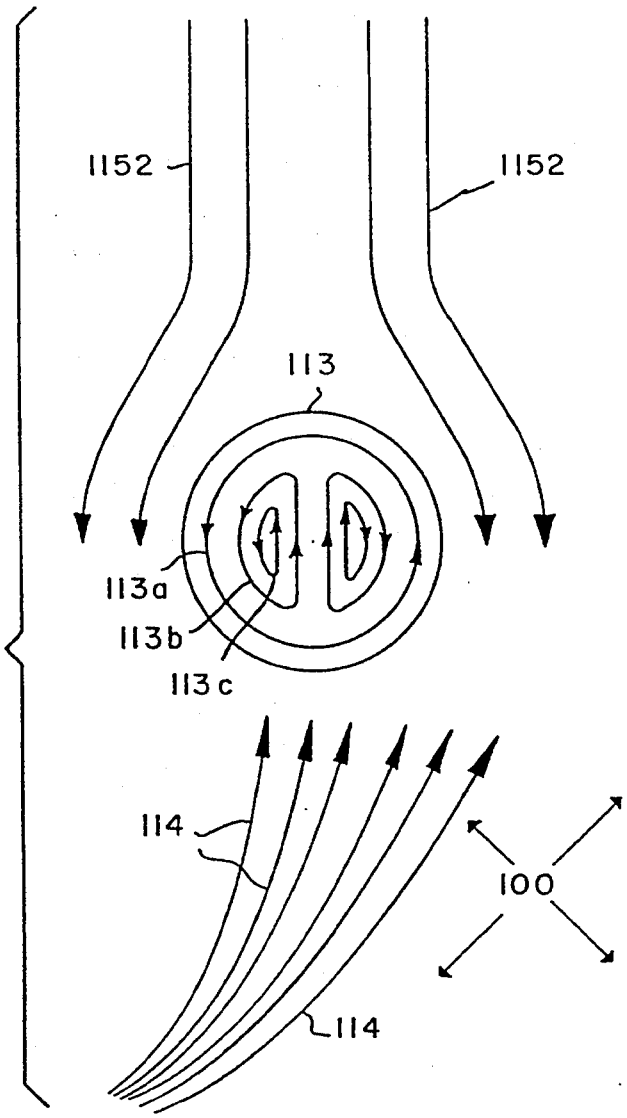
FIG. 5 is a view of a particle created by the apparatus of the invention to illustrate the flow of gases.

FIG. 5 shows what theoretically happens in the flow of a particle 113 being exposed to the downwardly flowing inert gases 1152 and the upwardly flowing air 114. The air would be flowing over the surface of particle 113 according to flow patterns 113A, 113B and 113C.

FIG. 6 shows a droplet 113 in air with initial radius $R_o$ which shrinks to R.

FIG. 7 shows a graph of the concentration changes of Cw (water) and Cn (flavor) with time and the change of pressure.

Figure 8:
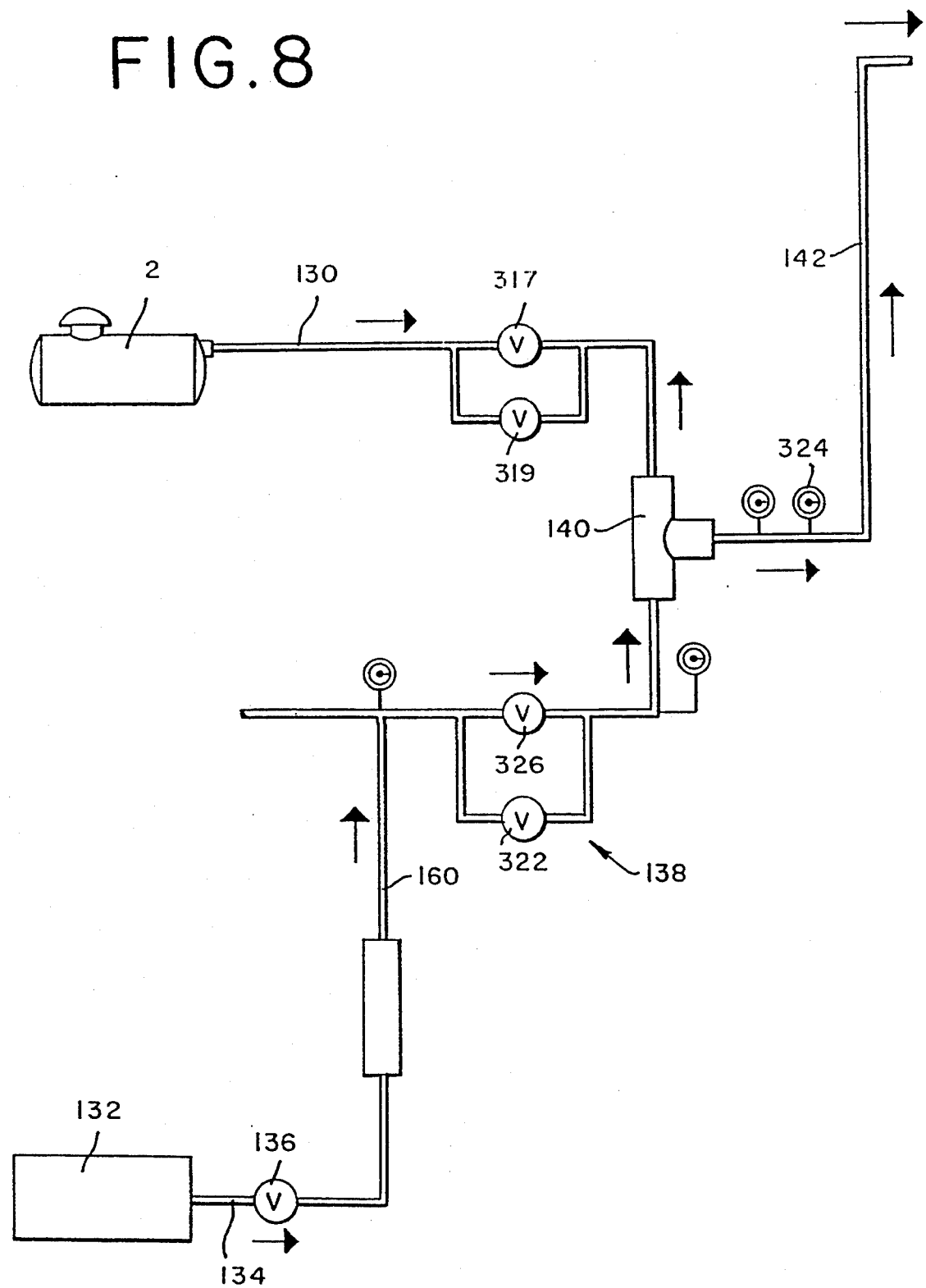
FIG. 8 is a piping diagram used in carrying out the invention.

FIG. 8 is a view of a portion of a portion of the flow diagram showing schematically in FIG. 1 and illustrates the tank containing the liquid nitrogen or the liquid carbon dioxide 2 which flows into line 130 is controlled by valves 317 and 319 to enter into the mixing device 140. At the same time compressed air in reservoir 132 enters line 134 and is controlled by valve 136 and passes through line 160 into the mixing device 140. It flow is controlled by a plurality of valves 326 and 322 in line 138. After mixing the composition flows through 142 to the manifold 120 (not shown).

FIG. 9 is a top plan view of a toroidal manifold 120 of the invention showing the openings 116A that are arranged perpendicular to the central axis of the manifold and essentially parallel to the walls of the fluidized spray chiller tank. Openings are located along the rim to permit the flow at an angle into the central area of the chiller space towards the center of the toroidal ring formed by the manifold. The centrally located spray nozzle 112 directs out the product spray in a radially downward direction 115.

FIG. 10A shows a perspective view of a toroidal manifold 120 with liquid nitrogen or liquid carbon dioxide entry port 142. Openings 117A permit the inlet gas to flow out in a radially downward and inwardly direction. Ports that are located on the under surface of the manifold permit the gas to also be introduced in a vertically downward 116 direction. The centrally located spray nozzle 122 has connection 184 for delivery of product line which is then sprayed downwardly indicated by the arrows 115.

FIG. 10B is a partial cross sectional view of the toroidal ring shown in FIG. 10 and shows the downwardly directed openings 116a projecting the gas in a downward direction 116'. The opening 117'a permits the gas to flow in a radially inwardly and downwardly direction 117'.

FIG. 10C is another embodiment of the manifold 120' and shows the respective openings 116'a and 117'a for directing the spray vertically downwardly 116' and radially, inwardly, and downwardly 117'.

FIG. 10D is a partial cross section of the toriodal shown in FIG. 10C.

FIG. 11 shows an another embodiment of the invention where the wall 102 of the chiller device has an interior portion 202 fitted with ribs 204 for providing improved performance of the unit. The product is introduced in line 142 and enters the interior of the chiller in a downwardly direction 116. The product 13A and 13B is obtained at the-bottom of the unit.

Figure 12:
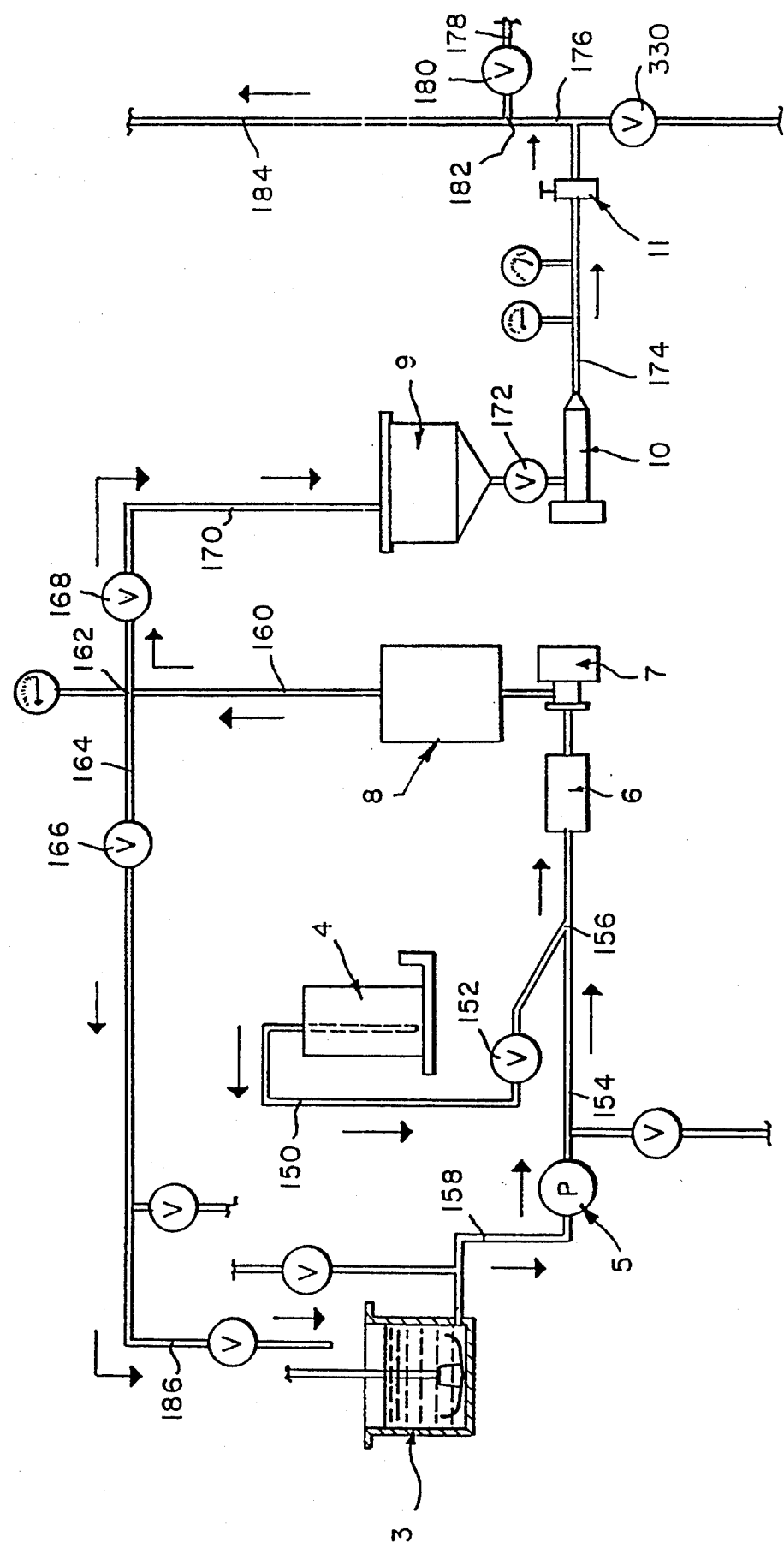
FIG. 12 is a schematic flow diagram illustrating part of the apparatus of the invention.

FIG. 12 is a section of the schematic flow diagram shown in FIG. 1 and shows in further detail the jacketed tank for containing the product, the introduction of the flavoring feed tank 4, through line 115 to converge with the product which flows in line 54 and to meet at 156.

Figure 13:
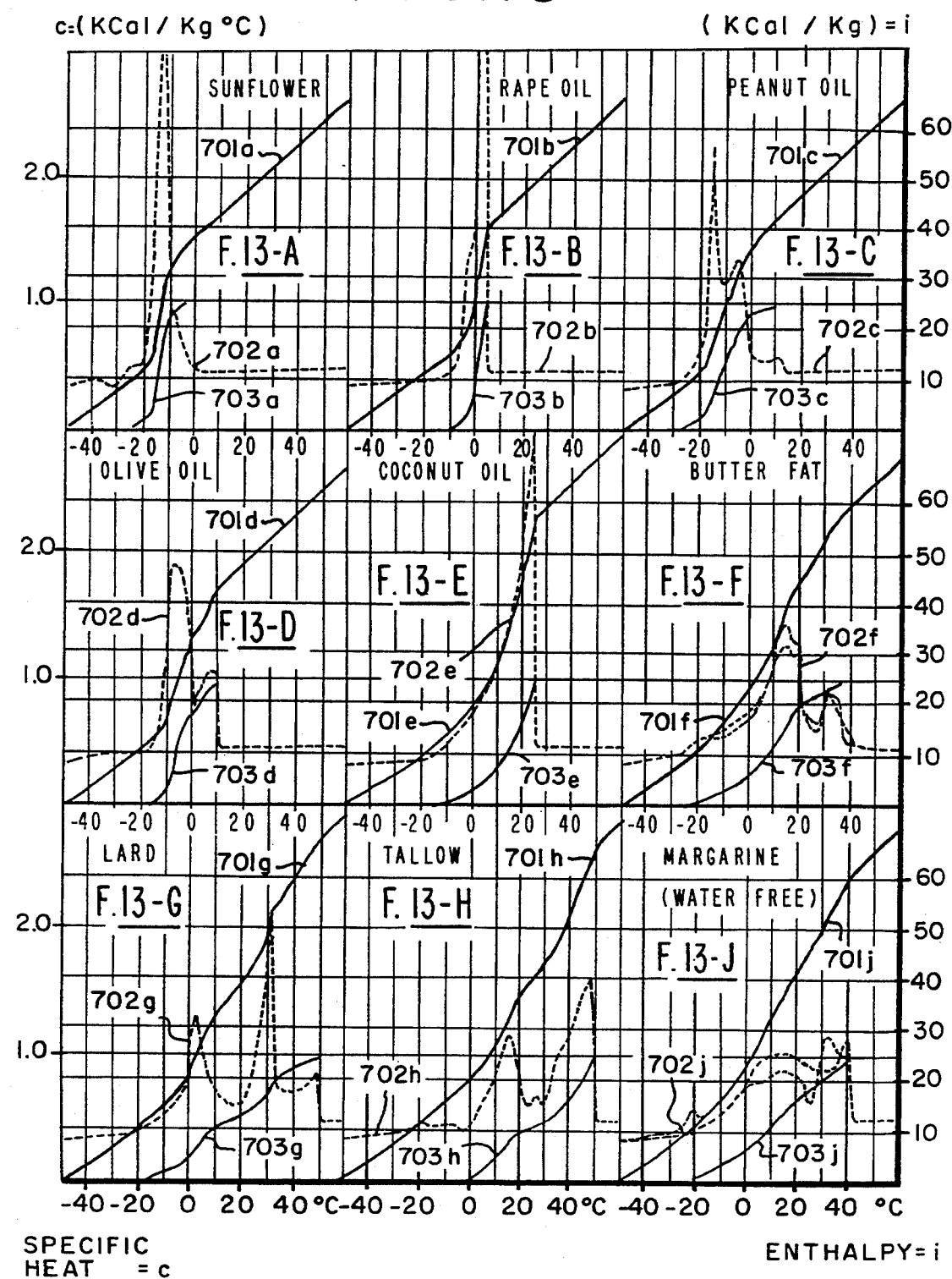
FIG. 13 is an overall graph of a plot of various encapsulating agents and their specific heat and enthalpy.

FIGS. 13 through 13J show plots of specific heat and enthalpy versus temperature for various oils.

The solid particulate flavoring agents that can be used according to this invention are materials having a melting point in the range of from about 130° F. to about 195° F. In certain preferred embodiments the melting point is from about 135° F. to about 60° F.

The encapsulating materials are high-melting edible solids. In certain embodiments of the invention, it is desirable that the encapsulating materials have melting points of from about 130° F. to about 180° F. The encapsulating agents can be hydrogenated vegetable oils, stearins, and edible waxes. It is preferred that fatty materials such as the vegetable oils or stearins having melting points of from about 130° F. to about 180° F. with relatively low free fatty acid and iodine values be utilized. It has been found desirable that the free fatty acid content of the fatty materials be no greater than 0.1 percent and that the iodine value be about five or less. Edible waxes can be obtained from vegetable, animal and/or mineral sources. These in certain desirable embodiments of the invention having melting points of from about 160° F. to about 195° F.

The high-melting point edible soluble materials, as taught above, include fatty materials and waxes. Certain materials which are particularly desirable for the practice of the invention include:

| Material | Melting Pt. (F.) |
| --- | --- |
| Hydrogenated vegetable oils | 130–160 |
| Partially hydrogenated cottonseed oil | 141–147 |
| Partially hydrogenated soybean oil | 152–158 |
| Partially hydrogenated palm oil | 136–144 |
| Mono- and diglycerides of fatty acids | 136–156 |
| Glyceryl monostearate | 158 |
| Glyceryl monopalmitate | 132 |
| Propylene glycol monostearate | 136 |
| Polyglycerol stearate | 127–135 |
| Polyoxyethylene sorbitol beeswax derivatives | 145–154 |
| Fatty acid esters of polyoxyethylene sorbitan | 140–144 |
| Polyglycerol esters of fatty acids | 135–138 |
| Beeswax | 143–150 |
| Carnauba wax | 180–186 |

The encapsulating materials suitable for use in the present invention include emulsifiers, and in many embodiments emulsifiers for water-in-oil emulsions. In certain desirable embodiments, the emulsifiers are edible monoglycerides, sorbitol monoesters, or lecithins. The monoglycerides are those prepared from edible fats and oils by know techniques. It has been found desirable that these materials contain at least 90 percent monoglyceride. A variety of lecithins can be utilized; the lecithins used are preferably oil-free with at least about 95 percent acetone insolubility.

The particulate flavor compositions can also desirably contain a texture conditioning agent. As used herein, a texturizing agent is a material which will absorb or hold the flavor composition. In certain embodiments of the invention, these are desirably silicon dioxide, powdered cellulose, or puffed dextrin, maltodextrin, and pregelatinized starches.

Silica used as a texture conditioning agent herein has a particle size n the range of 50 to 200 micrometers. Such silica may be produced by spray drying aqueous silica suspension. The porous structure thereby produced readily absorbs liquids while at the same time maintaining the flowability properties of the silicon dioxide. In certain embodiments of the invention, this silica can be crushed to reduce the particle size thereof to less than 20 micrometers. Comminuted silicas such as those produced from fumed silica and dehydrated silica gels can also be used.

The powdered cellulose for use with the apparatus of the present invention can be obtained by a dry mechanical process. Such cellulose powder contains approximately 90 percent beta-1,4-glucan and 10 percent of a hemicellulose such as xylan, araban, mannan, galactan, and the like. The high absorbency of this material for both fat and water enables it to be used to provide structure for the encapsulated powders of certain embodiments of the present invention.

The dextrin, maltodextrin, and pregelatinized starches have the capability of absorbing large quantities of water and oil. They are especially suited for use with water-based flavoring compositions according to the present invention.

As used herein, the term flavoring compositions includes one or more materials capable of imparting a flavor to, enhancing a flavor in, or modifying the flavor of a consumable material. They can be conventional flavoring compositions or they can be especially adapted to improve the flavor characteristics of foods to be prepared in a microwave oven.

The quantity of flavoring composition in the solid flavoring agents can be varied over a range. The quantity thereof will depend upon the particular foodstuff with which it is to be associated, whether the cooking will be done totally by microwave heating, a combination of microwave and induction heating, or by more conventional methods. The quantity of flavoring composition will also vary according to the packaging of the foodstuff, the length of time expected prior to consumption, the expected storage temperatures and other conditions, and the overall flavor impression desired. It will be appreciated by those skilled in the art that to some extent the flavor of food is frequently subjectively evaluated. Consequently, there is room for considerable variation. The quantity of flavoring composition in the solid flavoring materials of the invention also will depend upon the quantity of such materials to be added to the food. If a small quantity is added, the amount of flavoring material should be larger; the additional larger quantities of the solid flavoring material can entail the use of less flavoring composition.

It has been found that it is desirable to use relatively large quantities of flavoring composition in the particulate flavoring material of the invention. This reduces the amount of solid flavoring material to be added. The physical form of the solid flavoring material according to this invention provides for a good distribution of even small quantities throughout the foodstuff with which it is used. Accordingly, it is desirable that the quantity of flavoring composition be from about 30 to about 70 percent of the overall composition. In certain preferred embodiments, the flavoring materials comprise from 40 to 60 percent of the particulate flavoring material.

It will be understood herein that a flavoring composition is one capable of imparting a definite flavor to a tasteless or bland foodstuff, and a flavor-enhancing composition is one capable of reinforcing one or more flavor notes of a natural or other material which is deficient in flavor. A flavor-enhancing composition would be useful for improving the flavor of, say, a meat product, the flavor of which was diminished or undesirably altered by the processing. It will accordingly be understood that the flavoring compositions can include flavoring ingredients, carriers, vehicles and the like to form compositions suitable for imparting a flavor to, enhancing the flavor in, or altering the flavor of, a food composition, and such food compositions and the methods for preparing them are included in this disclosure.

The flavoring compositions can be used to enhance existing flavors in, or to provide the entire flavor impression to, a foodstuff. They can include organic acids including fatty, saturated, unsaturated and amino acids, alcohols, including primary and secondary alcohols, esters, carbonyl compounds including aldehydes and ketones, lactones, cyclic organic materials including benzene derivatives, alicyclics, heterocyclics such as furans, pyridines, pyrazines and the like, sulfur-containing materials including thiols, sulfides, disulfides and the like, proteins, lipids, carbohydrates, and so-called flavor potentiators such as monosodium glutamate, guanylates, inosinates, natural flavoring materials such as vanillin, and the like. It will be appreciated that the types and amounts of materials selected from the foregoing groups of materials will depend upon the precise organoleptic character desired in the finished product and, especially in the case of flavoring compositions used to enhance other flavors, will vary according to the foodstuff to which the flavor and aroma are to be imparted. Inorganic materials such as sodium chloride and freshness preservers such as butylated hydroxyanisole, butylated hydroxytoluene and propyl gallate can be added for their adjuvant preservative effects on the flavoring composition or on the final food composition itself.

As noted above, the flavoring compositions can include carriers such as gum arabic and carrageenen or vehicles such as ethyl alcohol, water, propylene glycol. When the carrier is an emulsion, the flavoring composition can also contain emulsifiers such as mono- and diglycerides of fatty acids and the like. With these carriers or vehicles the desired physical form of the composition can be prepared. It will be understood that the flavoring compositions can initially be in spray-dried, liquid, encapsulated, emulsified and other forms in which flavorings are added to foodstuffs.

The particulate flavoring agents for microwave foods according to this invention can be added to the food products by the manufacturer during preparation of the microwave foods in the plant. Alternatively, they can be added by the consumers before putting the microwave food into the microwave oven or after the food is partially cooked in the microwave oven. Among these different methods of adding flavors to microwave foods, the most appropriate and convenient for consumers is adding the flavoring during manufacturing of the food product.

The present invention provides apparatus for the chilling of encapsulated flavoring agents. The methods are based on interaction of the thermal, mechanical, and electrical properties of the materials. The nature of the cooling process affects the product. The encapsulated materials are profoundly affected by the transmission and absorption of electrical energy and by the heat and mass transfer modes occurring within the product during preparation and use. Microwave energy used in food preparation generally penetrates the materials to a depth of only a few centimeters.

We claim:

1. Apparatus for forming spray chilled encapsulated food additives comprising:
   a) an upright vertically positioned enclosure enclosing a working three dimensional space, said enclosure having
      i) a vertical central axis;
      ii) an upper section surrounding said axis;
      iii) a middle section surrounding said axis vertically located below and immediately adjacent said upper section; and
      iv) a lower section surrounding said axis vertically located below and immediately adjacent said middle section said enclosure having vertically enclosing sidewalls surrounding said axis having;
      a) an inner vertical surface;
      b) an upper circumferential edge atop said upper section;
      c) a lower circumferential edge at the bottom and said lower section;
      d) a top lid horizontally positioned lid supported by said vertically enclosing sidewalls and located on said upper circumferential edge having at least one gas exit orifice therethrough; and
      e) a base cover supporting said vertically enclosing sidewalls located on said lower circumferential edge having at least one solids exit orifice therethrough located within said lower section horizontally positioned in a first x-y plane,
         first compressed gas transmission means directing a first set of compressed gas molecules along substantially vertical directional vectors $V_{ia}$ from said lower section towards said upper section substantially adjacent the entire circumference of said vertically enclosing sidewalls located within said upper sections,
         horizontally positioned second compressed gas transmission means directing a second set of compressed gas materials along substantially vertically direction vectors $V_{ia}$ from said upper section towards said lower section and along a set of directional vectors $V_{ib}$ extending inwardly and downwardly from said upper section towards said central axis and said middle section at an angle between said direction vectors $V_{ib}$ and said directional vectors $V_{ia}$, and substantially centrally positioned proximate said first x-y plane and proximate said central axis, solidifiable molten fluidic substance nozzle feeding means for feeding solidifiable molten fluid particles in a substantially vertical direction along directional vector $V_{fp}$ from said upper section towards said middle and lower sections.

* * * * *